(12) United States Patent
Nakao

(10) Patent No.: US 6,715,378 B1
(45) Date of Patent: Apr. 6, 2004

(54) CONNECTING DEVICE FOR CONTROL CABLE

(75) Inventor: Tomoaki Nakao, Aichi Pref. (JP)

(73) Assignee: Nisshinbo Industries, Inc., Nagoya (JP)

( * ) Notice: Subject to any disclaimer, the term of this patent is extended or adjusted under 35 U.S.C. 154(b) by 72 days.

(21) Appl. No.: 09/699,447

(22) Filed: Oct. 31, 2000

(30) Foreign Application Priority Data

Nov. 2, 1999 (JP) .............................. 11-311783

(51) Int. Cl.⁷ ................................................ F16C 1/26
(52) U.S. Cl. ...................... 74/502.6; 74/502.4
(58) Field of Search ..................... 74/502.6, 502.4; 403/319, 316, 317, 314, 345, 353, 395, 230; 188/2 D, 79.51–79.64; 248/222.51, 222.52, 291.1

(56) References Cited

U.S. PATENT DOCUMENTS

| | | | | |
|---|---|---|---|---|
| 3,498,419 A | * | 3/1970 | Belart ........................ | 188/327 |
| 4,887,698 A | * | 12/1989 | Hunt et al. ................. | 188/325 |
| 4,930,605 A | * | 6/1990 | Boyer et al. ................ | 188/20 |
| 5,311,793 A | | 5/1994 | Panek et al. ................ | 74/502.6 |
| 5,671,639 A | * | 9/1997 | Wagner et al. ............. | 74/502.6 |
| 5,706,914 A | * | 1/1998 | Goldstein ................... | 188/2 D |

FOREIGN PATENT DOCUMENTS

| | | | | |
|---|---|---|---|---|
| DE | 1 783 505 | 11/1958 | | |
| DE | 43 07 861 A1 | 9/1994 | .......... | B60T/13/08 |
| EP | 1 041 301 A2 | 10/2000 | ............. | F16C/1/14 |

* cited by examiner

Primary Examiner—David A. Bucci
Assistant Examiner—Vicky A. Johnson
(74) Attorney, Agent, or Firm—Young & Thompson

(57) ABSTRACT

A device for engaging or disengaging an end fitting of a control cable to or from a lever in a drum brake or the like is arranged to be shorter but to have a large lever ratio for the lever. A shoe is engaged with one end of a strut, and the lever is pivotally journalled to the other end of the strut while another shoe is engaged with the lever at a portion near to the journalled part. The strut has two opposed side walls and a bridge part therebetween for restraining the lever at a specified position. The lever is composed of a pair of planer members which are joined together at the proximal end, and are spaced apart from each other at the free end to form a narrow gap and at the longitudinally middle portion to form a wide gap. The narrow gap allows a cable itself of the cable to pass therethrough but to inhibit from passing therethrough and the wide gap allows a longer side of the end fitting to pass therethrough. The planar members are formed with protrusions defining a gap therebetween a size of which is smaller than the length of the longer side of the end fitting. Upon engaging the end fitting, it is inserted through the wide gap to abut against the protrusions, and then, shifted toward the free end of the lever to be engaged with the free end of the lever.

8 Claims, 8 Drawing Sheets

CONNECTING DEVICE FOR CONTROL CABLE

BACKGROUND OF THE INVENTION

1. Field of the Invention

The present invention relates to a device for operating a pair of members to be operated, such as brake shoes in a drum brake, so as to mechanically move these members away from each other through the manipulation of a lever, and in more detail, a device for detachably connecting a control cable to the lever.

2. Description of the Related Art

As to a control cable connecting device for the above-mentioned operating device, there has conventionally been known, for example, a device as shown in FIGS. 10a and 10b for detachably connecting a brake cable with a lever for operating a drum brake, which is disclosed in U.S. Pat. No. 5,311,793.

Referring to FIGS. 10a and 10b, there are shown a pair of brake shoes 1, 2 as members to be operated, a bracket 3, a lever 4, and a brake cable 5 as a control cable, which interact with one another as explained as follows, so as to constitute an operating device 6 for a drum brake.

The bracket 3 is formed at its one end with a cut-out 3a to which one of the brake shoes 1 is engaged, and the bracket 3 is provided at the other end with the lever 4 pivotally journalled at its proximal end by means of a pivot pin 7, while the lever 4 is formed at the proximal end with cut-outs 4a to which the other brake shoe 2 is engaged.

The lever 4 is further formed at its free end with cut-outs 4b to which an end fitting 5a of the brake cable 5 is engaged in a cable pulling direction.

With this arrangement, when a cable pulling force is inputted to the lever 4 through the brake cable 5, in the direction indicated by the arrow W, the lever 4 is rotated around the pivot pin 7 in the corresponding direction to push the brake shoe 2 outward.

Meanwhile, the rotation of the lever 4 around the pivot pin 7 applies a reaction force to the bracket 3 through the intermediary of the pivot pin 7, and accordingly, the bracket 3 is also pushed outward together with the brake shoe 1.

As a result, the brake shoes 1, 2 are moved away from each other and are pressed against the inner peripheral surface of a brake drum which is not shown, whereby a braking operation can be carried out.

The operating device 6 for a drum brake is preferably constituted in such manner that the brake cable 5 can be engaged with or disengaged from the cut-outs 4b of the lever 4 while the drum brake is incorporated in useable condition, and accordingly, the operating device 6 is further incorporated therein additionally with the following arrangement.

That is, as clearly shown in FIG. 10a, the bracket 3 is forked, except the end part where the cut-out 3a is formed, so as to have a space which is defined by a pair of opposed legs 3b, 3c and an inner end wall 3d, in which space the lever 4 is accommodated.

Further, the lever 4 is also forked, except the proximal end in which the pivot pin 7 and the cut-outs 4a are provided, so as to define a space between a pair of opposed legs 4c, 4d, though which space the brake cable 5 can pass.

Moreover, the distance between the pair of opposed legs 4c, 4d is selected such that the end fitting 5a of the brake cable 5 cannot pass through the space and the opposed legs 4c, 4d are formed respectively with the abovementioned cut-outs 4b for engaging the end fitting 5a.

As clearly shown in FIG. 10b, the distance "A" as a gap between the free end face of the lever 4 and the inner end wall 3d of the bracket 3 is set to be such a size that the end fitting 5a can pass through, and a V-shaped leaf spring 8 is interposed so as to block the above gap, one leg 8a of the leaf spring 8 is made into close contact with the inner end wall 3d.

The other leg 8b of the leaf spring 8 is made into close contact with the free end face of the lever 4 to define a convergent tapering space 9 between the other leg 8b and the free end face of the lever 4, which convergent tapering space 9 guides the end fitting 5a upon insertion of the latter which will be explained hereinafter.

As to the engagement of the brake cable 5, the end fitting 5a indicated by the two-dot chain line in FIG. 10b is inserted into the space 9 from the outside of the drum brake, and then, the brake cable 5 and its end fitting 5a are pushed as indicated by the arrow α.

At this time, the end fitting 5a further advances while elastically deforming the spring leg 8b in a direction indicated by the arrow β with using the free end face of the lever 4 as a reaction force receiver. When the end fitting 5a overrides the free end face of the lever 4, the end fitting 5a is pushed by elastic restoration of the spring leg 8b in a reverse direction against which indicated by the arrow β so that the end fitting 5a is engaged with the cut-outs 4b.

It should be noted that this elastic restoration of the spring leg 8b makes it possible to prevent the end fitting 5a from disengaging from the free end of the lever 4.

Upon detaching the brake cable 5, the spring leg 8b is elastically deformed in the direction indicated by the arrow β with use of a suitable tool inserted from the outside of the drum brake, and in this condition, in reverse order of the aforementioned steps, the end fitting 5a is disengaged from the cut-outs 4b, and then the brake cable 5 is pulled out so as to be removed.

In the above-mentioned conventional device for connecting the control cable for the drum brake, since the end fitting 5a of the brake cable 5 is allowed to pass through the gap between the free end face of the lever 4 and the inner end wall 3d of the bracket 3 so as to carry out engagement or disengagement of the brake cable 5 relative to the free end of the lever 4, and further, since it is necessary to normally block this gap with the V-shaped leaf spring 8 in order to prevent the end fitting 5a from disengaging from the free end of the lever 4, the gap required for passing the end fitting 5a as indicated by "A" in FIG. 10b should be set to a value which is larger than the sum of the diameter of the end fitting 5a and the value twice as large as the thickness of the V-shaped leaf spring 8.

Accordingly, there has been a problem such that the overall length of the operating device 6 becomes longer, and further, in such a case that the overall length of the operating device cannot be increased due to design restriction, since the distance "a" from the center of the pivot pin 7 to the end fitting 5a of the brake cable 5 cannot be increased, that is, the lever ratio (a/b) of the lever 4 which is the ratio between the distance "a" and the distance "b" from the center of the pivot pin 7 to the cutouts 4b cannot be increased, there is caused such a problem that the brake operating force becomes larger.

Thus, it has not been able to satisfy both requirements of reducing the brake operating force and of shortening the overall length of the operating device 6.

SUMMARY OF THE INVENTION

An object of a first aspect of the present invention is to provide a device for connecting a control cable, in which an end fitting of the control cable can be inserted into a position between the a journalled portion and the free end of the lever so as to be engaged with or disengaged from the free end of the lever, whereby eliminating above-mentioned problems inherent to conventional operating devices, that is, the problems such that the overall length of the operating device become longer and the brake operating force becomes larger due to the lever ratio of the lever to be ensured, and whereby satisfying both requirements of shortening the overall length of the operating device and of reducing the brake operating force.

To the end, there is provided a device for connecting a control cable for use in an operating device comprising
- a strut of which one end is engaged with one of members to be operated,
- a lever which is pivotally journalled to the other end of the strut and is engaged with the other of said members, and
- a control cable having at its one end an end fitting which is adapted to be engaged with a free end of the lever in a cable pulling direction,
- when applying cable pulling force to a free end of the lever by means of the control cable, the lever and strut being urged to be rotated relative to each other around the journalled portion so as to urge said members to be operated, away from each other, characterized in that:
  said end fitting of the control cable can be inserted into a position where being between the journalled portion and the free end of the lever in a reverse direction against the cable pulling, and thereafter said end fitting of the control cable can be engaged with the free end of the lever.

Accordingly, it is possible to eliminate the necessity of setting an insertion gap between the free end face of the lever and the strut, and accordingly, the overall length of the operating device can be shortened by a degree corresponding to a decrease of the insertion gap, while the lever ratio of the lever can be increased to reduce the operating force, thereby satisfying both requirements of shortening of the overall length of the operating device and of reducing the operating force of the operating device.

An object of a second aspect of the present invention, is to provide a device for connecting a control cable, which is arranged to inexpensively achieve the functional effects and advantages exhibited by the first aspect of the present invention.

To the end, in addition to the first aspect of the present invention, there is provided a device for connecting a control cable, characterized in that the lever is composed of a pair of planar members opposed to each other, which planar members are coupled with each other at a portion corresponding to the proximal end of the lever to be pivotally journalled to the other end of the strut, and which planar members are spaced from each other at a portion corresponding to the free end of the lever so as to define a narrow gap between the planar members, having a size which allow a cable itself of the control cable to pass therethrough but which inhibits the end fitting of the control cable from passing therethrough, and to define a wide gap between the planar members at a longitudinally middle portion so as to step down to the narrow gap, having a size which allow the end fitting of the control cable to pass therethrough.

When engaging the end fitting with the free end of the lever, it can be accomplished by steps of firstly inserting the end fitting into the lever through the wide gap, and of shifting the end fitting toward the free end of the lever. Accordingly, the functional effects and advantages of the first aspect of the present invention can be achieved inexpensively by use of structure which can be formed by press work.

An object of a third aspect of the present invention is to provide a device for connecting a control cable, which can enhance the workability upon insertion of the end fitting of the control cable during attaching operation of the control cable.

To the end, in addition to the second aspect of the present invention, there is provided a device for connecting a control cable, characterized in that the end fitting of the control cable has a shape in which one side is longer than the other side as viewed in the longitudinal direction of the control cable, and the wide gap has a size with which the length of the one side of the end fitting can pass through the wide gap.

When engaging the end fitting with the free end of the lever, it can be accomplished only by inserting the end fitting so that the long side thereof is directed orthogonal to the planar members of the lever, and with the posture thereof being held as it is, by shifting the end fitting toward the narrow gap between the planer members without rotating the end fitting.

Accordingly, it is possible to enhance the workability of connecting operation of the control cable to the operating device.

An object of a fourth aspect of the present invention is to provide a device for connecting a control cable, which can reduce the widthwise dimension of the operating device.

To the end, in addition to the second aspect of the present invention, there is provided a device for connecting a control cable, characterized in that the end fitting of the control cable has a shape in which one side is longer than the other side as viewed in the longitudinal direction of the control cable, and the wide gap has a size with which the length of the other side of the end fitting can pass therethrough, but the length of the one side cannot pass therethrough.

Although the end fitting should be turned by an angle of 90 deg. around the axis of the cable after the end fitting is inserted through the wide gap, the overall width of the operating device can be reduced by a degree corresponding to a decrease in width of the wide gap.

An object of a fifth aspect of the present invention is to provide a device for connecting a control cable, in which the end fitting of the control cable can be inserted even though the lever is not held, and accordingly, the control cable can be attached after the operating device is attached in useable condition, thereby it is possible to facilitate the handling and the conveyance of the assembly to which the operating device is attached.

To the end, in addition to any one of the first to the fourth aspect of the present invention, there is provided a device for connecting a control cable, characterized in that the lever is provided with an end fitting stopper for receiving the end fitting of the control cable upon insertion thereof so as to determine an insertion position thereof, and the strut is provided with a lever abutting part for restricting the rotation of the lever relative to the strut in the direction of insertion of the end fitting.

The end fitting does not interfere with any other component when the end fitting has been inserted into the wide gap, and a worker can sense such a fact that the insertion work of the end fitting has been completed, thereby it is possible to facilitate the engagement or disengagement of the end fitting of the control cable.

Further, the end fitting can be inserted into the lever even though the lever is not held, and accordingly, the control cable can be connected to the operating device which has been attached in useable condition. Thereby it is possible to facilitate the handling and the conveyance of a unit such as a drum brake or the like in which the operating device is incorporated.

An object of a sixth aspect of the present invention is to provide a device for connecting a control cable, which allows a worker to sense the completion of insertion work of the end fitting.

To the end, in addition to any one of the first to fourth aspects of the present invention, there is provided a device for connecting a control cable, characterized in that the strut is provided with an end fitting stopper for receiving the end fitting of the control cable upon insertion thereof so as to determine an insertion position thereof.

The end fitting does not interfere with any other component upon insertion thereof into the wide gap, and a worker can senses completion of the insertion work of the end fitting, thereby it is possible to facilitate the engagement or disengagement of the end fitting of the control cable.

An object of a seventh aspect of the present invention is to provide a device for connecting a control cable which can exhibit functional effects and advantages similar to those exhibited by the fifth aspect of the present invention with use of another means which is different from the fifth aspect of the present invention.

To the end, in addition to any one of the first to fourth, there is provided a device for connecting a control cable, characterized in that there is provided on the strut the lever abutting part for restricting the rotation of the lever relative to the strut in the direction of insertion of the end fitting of the control cable.

The end fitting can be inserted even though the lever is not held, and accordingly, the control cable can be connected to the operating device which has been attached in useable condition. It is possible to achieve, with use of another means different from the fifth aspect of the present invention, the functional effects similar to those attained, thereby such that the handling and the conveyance of a unit such as a drum brake which is attached with the operating device can be facilitated.

An object of an eighth aspect of the present invention is to provide a device for connecting a control cable which can simply and inexpensively achieve the functional effects of the sixth and the seventh aspects of the present invention by structure which can be formed with use of press work.

To the end, in addition to the sixth or seventh aspect of the present invention, there is provided a device for connecting a control cable, characterized in that the strut is composed of opposed side walls between which the lever is interposed on opposite sides in the direction of the rotational axis of the lever, and a bridge part connecting between the opposed side walls which bridge part serves as the end fitting stopper, the lever abutting parts or both of them.

The functional effects of the sixth or seventh aspect of the present invention can be simply and inexpensively achieved by a structure which can. be formed with use of press work.

An object of a ninth aspect of the present invention is to provide a device for connecting a control cable, which can simply and inexpensively achieve functional effects obtained by both seventh and eighth aspects of the present invention by structure which can be formed with use of press work.

To the end, in addition to the eighth aspect of the present invention, there is provided a device for connecting a control cable, characterized in that the strut is provided with two bridge parts one of which is arranged in opposition to an intermediate part between the journalled portion and the free end of the lever so as to serve as the end fitting stopper, and the other one of which is located in the vicinity of the journalled portion of the lever so as to serve as the lever abutting part.

The functional effects and advantages exhibited by both seventh and eighth aspects of the present invention can be simply and inexpensively achieved by a structure which can be formed with use of press work.

An object of a tenth aspect of the present invention is to provide a device for connecting a control cable, which can prevent the end fitting of the control cable from interfering with another component when the end fitting is engaged with the free end of the lever after insertion.

To the end in addition to the eighth or ninth aspect of the present invention, there is provided a device for connecting a control cable, characterized in that the bridge part serving as the end fitting stopper is provided with an end fitting guide piece extended toward the narrow gap.

The end fitting of the control cable does not interfere with any other component when the end fitting is engaged with the free end of the lever after insertion, thereby it is possible to enhance the workability for connecting the control cable.

An object of an eleventh aspect of the present invention is to provide a device for connecting a control cable, which can prevent the end fitting of the control cable from interfering with any other component even if the control cable is slackened after the end fitting has been engaged with the free end of the lever.

To the end, in addition to the tenth aspect of the present invention, there is provided a device for connecting a control cable, characterized in that the end fitting guide piece is extended to a position above the narrow gap.

The end fitting can be prevented from interfering with another component even if the control cable is slackened after the end fitting has been engaged with free end of the lever.

An object of a twelfth aspect of the present invention is to provide a device for connecting a control cable, in which the slide motion between the end fitting and the lever becomes smooth in a condition such that the end fitting is engaged with the free end of the lever, so that the durability of the operating device can be enhanced.

To the end, in addition to any one of the first to eleventh aspects of the present invention, there is provided a device for connecting a control cable, characterized in that the engagement of the end fitting of the control cable with the free end of the lever is obtained through cylindrical surfaces.

The slide motion between the lever and the end fitting becomes smooth in a condition such that the end fitting is engaged with the free end of the lever, as a result of this it is possible to enhance the durability of the operating device.

BRIEF DESCRIPTION OF THE DRAWINGS

FIG. 1b is a local sectional front view illustrating the drum brake operating device shown in FIG. 1a;

FIG. 2b is a local sectional front view illustrating the device for connecting a control cable shown in FIG. 2a;

FIG. 3b is a local sectional front view illustrating the drum brake operating device shown in FIG. 3a;

FIG. 4b is a local sectional front view illustrating the drum brake operating device shown in FIG. 4a;

FIG. 5b is a local sectional front view illustrating the drum brake operating device shown in FIG. 5a;

FIG. 6b is a front view illustrating the end fitting of the control cable shown in FIG. 6a;

FIG. 7b is a front view illustrating the end fitting of the control cable shown in FIG. 7a;

FIG. 8b is a front view illustrating the end fitting of the control cable shown in FIG. 8a;

FIG. 10b is a side view illustrating the drum brake operating device shown in FIG. 10a.

DESCRIPTION OF THE PREFERRED EMBODIMENTS

Explanation will now be made of preferred embodiments of the present invention with reference to the drawings.

Figure 1A:
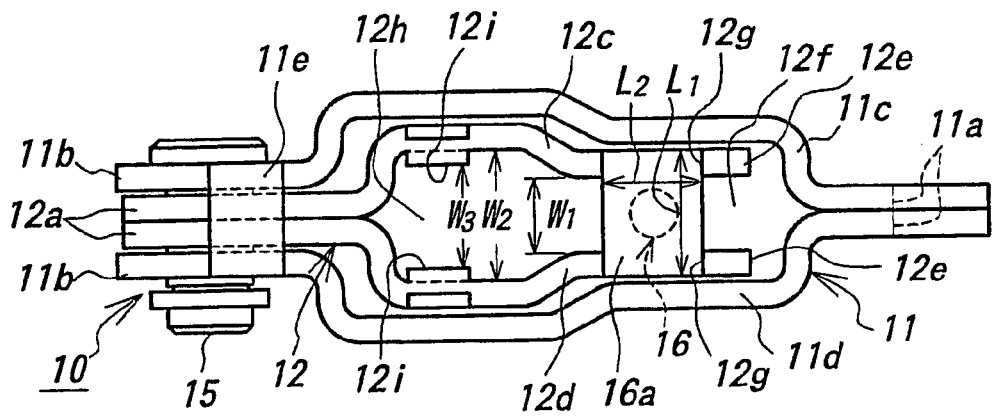
FIG. 1a is a plan view illustrating a drum brake operating device incorporating therein a device for connecting a control cable in an embodiment of the present invention.
Figure 1B:
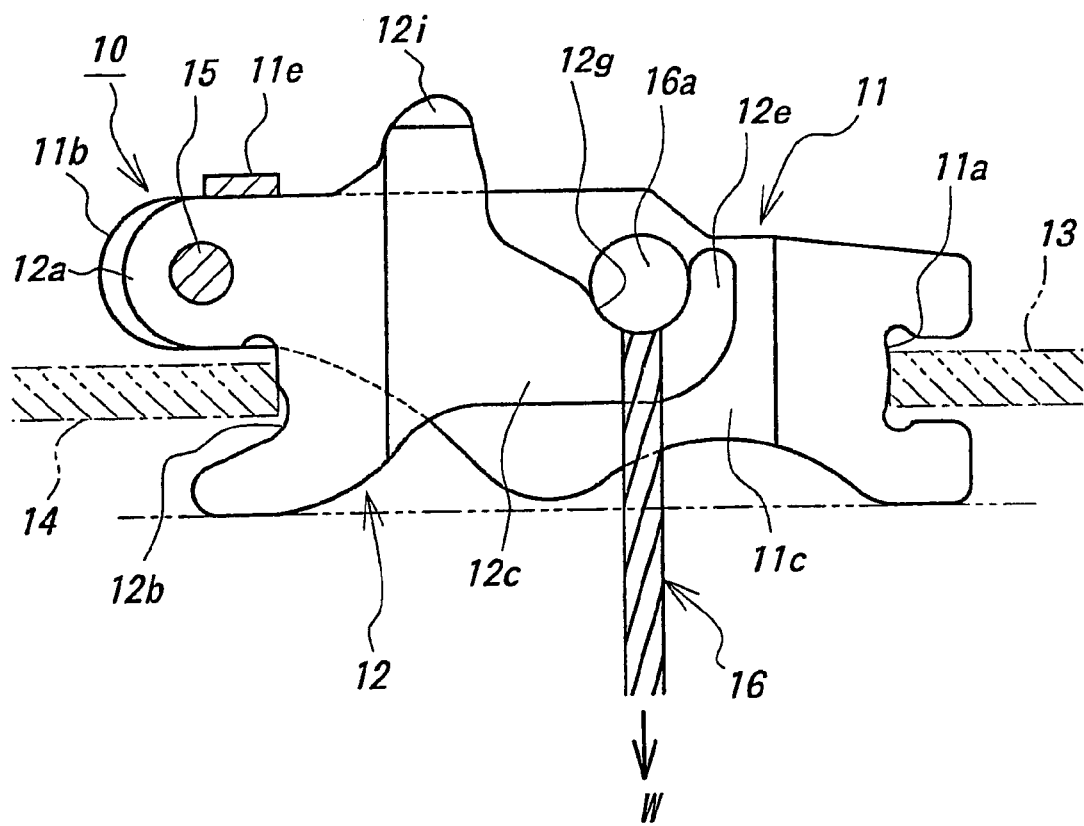

Referring to FIGS. 1a and 1b which show a drum brake operating device 10 incorporating a device for connecting a control cable according to a preferred embodiment of the present invention, the operating device 10 is substantially composed of a strut 11 and a lever 12.

The strut 11, as shown in FIG. 1b, is arranged between one ends of brake shoes 13, 14 as members to be operated, and the strut 11 is formed at its one end with a brake shoe engaging groove 11a for the one brake shoe 13.

The lever 12 is pivotally journalled at its proximal end 12a to an other end 11b of the strut 11 by means of a pivot pin 15, and the lever 12 is formed with a brake shoe engaging groove 12b for the other brake shoe 14, which brake shoe engaging groove 12b is arranged in the vicinity of the journalled portion of the lever 12.

The strut 11 is formed of a single plate which is bent in the form of a rectangular frame. This rectangular frame has side walls 11c and 11d opposed to each other, which side walls 11c, 11d are made into close contact with and joined to each other by spot welling or the like, at one ends where the brake shoe engaging groove 11a is formed.

The other ends of these side walls 11c, 11d are spaced from each other by distance so as to loosely clamp the proximal end 12a of the lever 12, and are integrally incorporated with each other by an upper bridge part 11e which serves as a lever abutting part for receiving the lever 12 as shown in FIG. 1b so as to restrict the lever from further rotation in the counterclockwise direction shown in FIG. 1b from its initial position in a non-braking condition.

Longitudinally middle portions of the opposed side wall 11c and 11d are spaced from each other larger than that at the other end 11b, and the distance is determined to permit the lever 12, detailed hereinafter, to pass therethrough.

The lever 12 is composed of a pair of planar members 12c, 12d opposed to each other. These planar members 12c, 12d are made into close contact with and joined to each other by spot welding or the like, at a portion corresponding to the proximal end 12a of the lever 12 to be pivotally journalled to the other end 11b of the strut 11 by the pin 15. The planar members 12c, 12d are spaced from each other in a forked shape to form a gap, as shown in FIG. 1a in the remaining portion except the above-mentioned portion, which gap is determined as will be explained latter in relation to the end fitting 16a to be connected to the free end of the lever 12.

The end fitting 16a has, for example, a columnar shape, having one side of a length $L_1$ which is longer than the length $L_2$ of the other side as shown in FIG. 1a, 1b, as viewed in the longitudinal direction of the control cable 16.

A gap 12f between the planer members 12c, 12d at a position corresponding to the free end 12e of the lever 12 is a relatively narrow gap having a width $W_1$ through which a cable itself of the control cable 16 can pass but the end fitting 16a of the control cable 16 at least at its long side $L_1$ cannot pass so that the end fitting 16a can be engaged with the free end 12e in a direction same as the cable pulling direction W.

For the engagement of the end fitting 16a with the free end 12e of the lever 12, the planar members 12c, 12d are formed at portions corresponding to the free end 12e of the lever 12, respectively, with end fitting engaging recesses 12g for engaging the columnar shaped end fitting 16a, which end fitting engaging recesses 12g have circular arc shaped engaging surfaces which are curved so as to have a curvature similar to that of the outer periphery of the end fitting 16a.

The gap 12h between the planar members 12c, 12d at the longitudinally middle position of the lever 12 is a relatively wide gap having a width $W_2$ through which the long side $L_1$ of the end fitting 16a can pass, and which wide gap 12h is stepped down to the narrow gap 12f.

Protrusions 12i disposed on the planar members 12c, 12d also in the longitudinally middle position of the lever 12 are formed on the upper edges of the planar members 12c, 12d on the side remote from the cable pulling direction "W", so as to protrude in direction approaching to each other. The distance $W_3$ between the protrusions 12i is set to be smaller than the long side $L_1$ of the end fitting 16a, so that the protrusions 12i serve as end fitting stoppers having a function which will be explained later.

With this arrangement, when a cable pulling force as indicated by the arrow "W" in FIG. 1b, is loaded to the lever 12 through the control cable 16, the lever 12 is rotated around the pivot pin 15 in the clockwise direction as viewed in FIG. 1b so as to push the brake shoe 14 outward.

Meanwhile, the rotation of the lever 12 around the pivot pin 15 apply a reaction force to the strut 11 through the pivot pin 15, and accordingly the strut 11 is pushed together with the brake shoe 13 outward too.

Thus, both brake shoes 13, 14 are moved away from each other, and are pressed against the inner peripheral surface of a brake drum which is not shown, so as to carry out a braking operation.

Figure 2A:
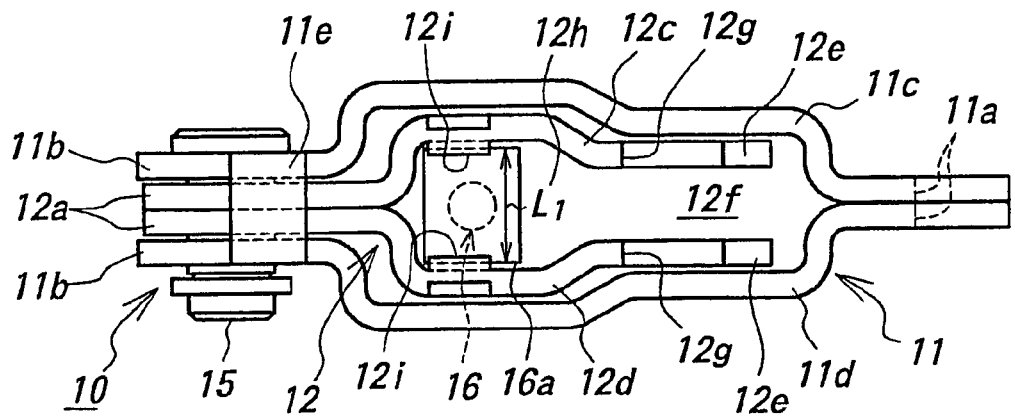
FIG. 2a is a plan view illustrating the device for connecting a control cable, shown in FIG. 1a, in a condition just after a control cable and an end fitting thereof are inserted in the drum brake operating device.

When the end fitting 16a of the control cable 16 is inserted from the outside of the drum brake into the operating device 10 and then engaged with the lever 12 (in more detail, the end fitting engaging recesses 12g), the end fitting 16a is led through a back plate 17 of the drum brake while the long side $L_1$ of the end fitting 16a is extended orthogonal to the planar members 12c, 12d of the lever 12, as shown in FIG. 2a.

Then, the end fitting 16a is inserted in the wide gap 12h between the planar members 12c, 12d in a reverse direction against the cable pulling direction "W" so as to abut against the protrusions 12i as shown in the FIG. 2a.

Figure 2B:
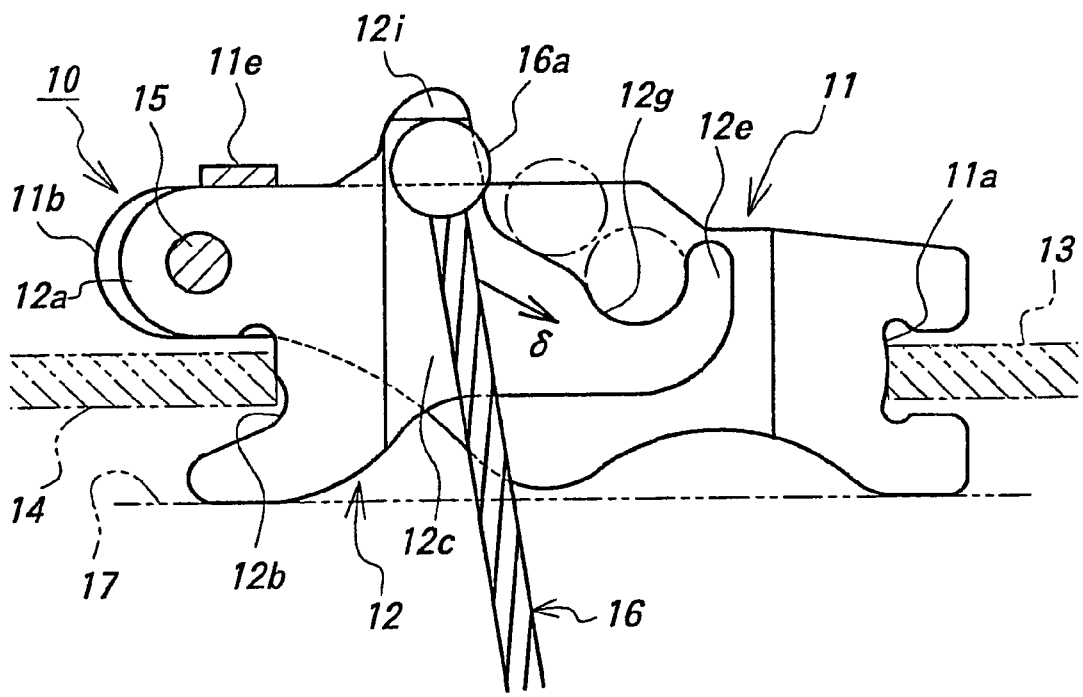

The end fitting 16a abuts against the lever 12 so as to tend to rotate the latter in the counterclockwise direction in FIG. 2b, but such rotation of the lever 12 is surely prevented since the lever 12 abuts against the bridge part 11e between the opposed side walls 11c, 11d of the strut 11, thereby it is possible to enhance the workability of control cable connecting work.

Referring to FIGS. 2a and 2b which show such a condition that the end fitting 16a has completely passed through the wide gap 12h between the planar members 12c, 12d, the control cable 16 in this condition is shifted toward the free end 12e of the lever 12 as indicated by the arrow δ in FIG. 2b, and then the end fitting 16a is engaged with the end fitting engaging recesses 12g.

It should be noted that the removal of the control cable 16 from the operating device 10 can be made by carrying out the above-mentioned steps in the reverse order.

Figure 10A:
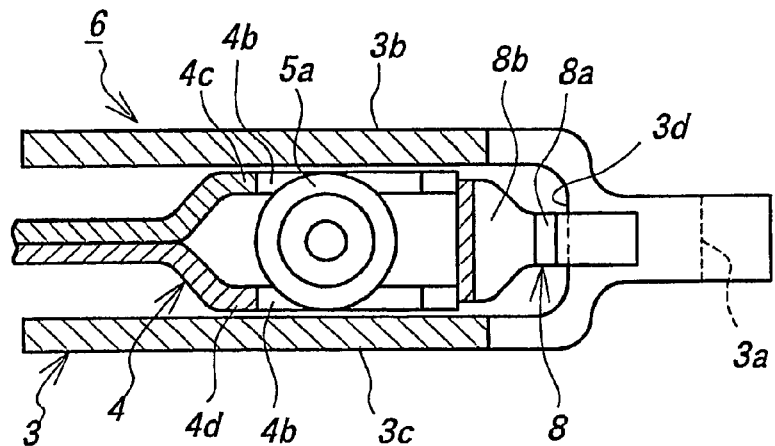
FIG. 10a is a cross-sectional view along line X—X in FIG. 10b, illustrating a drum brake operating device incorporating a conventional device for connecting a control cable.
Figure 10B:
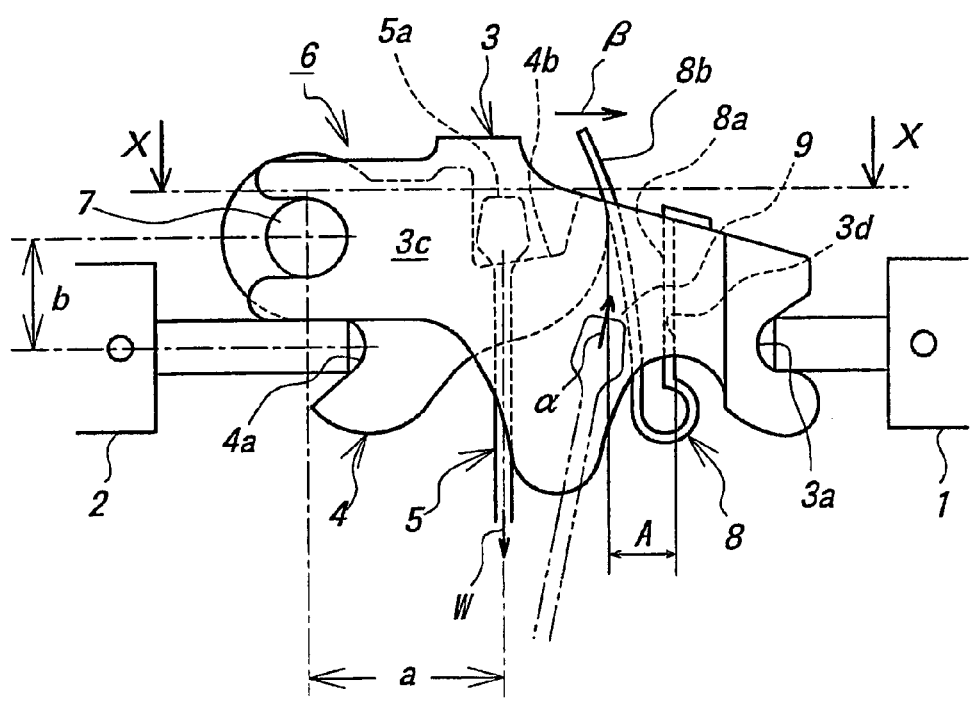

When the control cable 16 is connected to the operating device 10, the end fitting 16a is led through the wide gap 12h defined between the planar members 12c, 12d in the longitudinally middle position of the lever 12, and thereafter, the control cable 16 is shifted toward the free end 12e of the lever 12 in order to engage the end fitting 16a with the end fitting engaging recesses 12g, it is not required to set a gap indicated by "A" in FIG. 10b, between the free end face of the lever 12 and the strut 11. Accordingly, the overall length of the operating device 10 can be shortened by a degree corresponding to the decrease of this gap. Further, in such a case that it is not required to shorten the overall length of the operating device 10, the lever ratio of the lever 12 is increased so as to reduce the brake operating force.

For the above, it is possible to satisfy such a desire that the brake operating force can be reduced while the overall length of the operating device 10 is shortened.

Further, upon engagement or disengagement of the end fitting 16a, it can be made only by insertion or removal of the end fitting 16a into or from the drum brake and by shifting the control cable 16 to or from the free end of the lever 12. Accordingly, also due to the fact that the rotation of the control cable 16 by an angle of 90 deg. around its longitudinal axis is not required, the end fitting 16a can be engaged and disengaged in an extremely simple manner.

Further, in view of such an arrangement that the lever 12 is provided with the protrusions 12i against which the end fitting 16a abuts when it is inserted in the wide gap 12h, and that the rotation of the lever 12 caused by the above abutting of the end fitting 16a is adapted to be inhibited by the bridge part 11e of the strut 11, it is possible to prevent the end fitting 16a from interfering with another component during insertion of the end fitting 16a, and to make a worker to sense the completion of the insertion work of the end fitting 16a, in these points the engagement or disengagement of the end fitting 16a can be facilitated.

In addition, since the end fitting 16a can be inserted into the operating device 10 even though the lever 12 is not held, the control cable 16 can be connected to the operating device 10 even after the operating device 10 is incorporated in the drum brake, whereby it is possible to facilitate the handling and the conveyance of the drum brake incorporated therein with the operating device 10.

Referring to FIG. 3 which shows a device for connecting a control cable in another embodiment of the present invention, in this embodiment, the strut 11 is provided with a bridge part 11f which, in stead of the protrusions 12i provided on the lever 12 shown in FIGS. 1a, b and 2a, 2b, can restrict the inserted position of the end fitting 16a of the control cable 16.

To the end, the bridge part 11f is not located at a position in the vicinity of the journalled portion (pivot pin 15) between the strut 11 and the lever 12, but is located above the wide gap 12h so as to be used as an end fitting stopper.

Figure 3A:
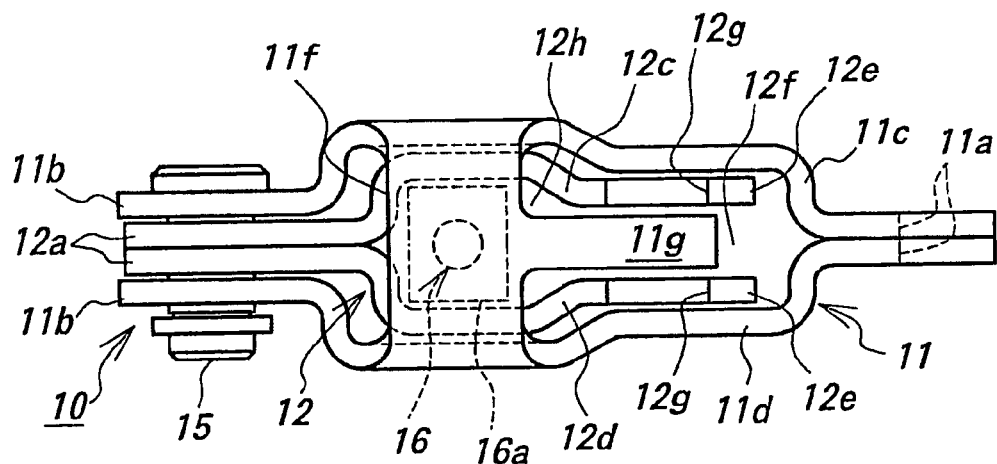
FIG. 3a is a plan view illustrating a drum brake operating device incorporating therein a device for connecting a control cable in another embodiment of the present invention.
Figure 3B:
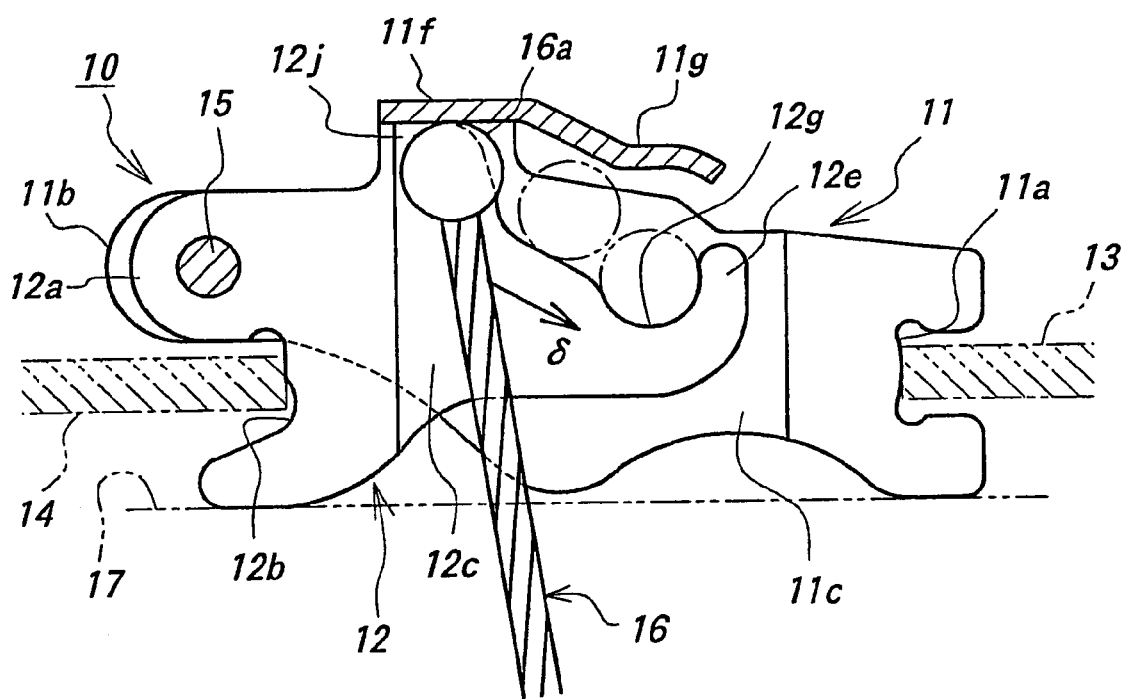

Further, in order to use the bridge part 11f also as a lever abutting part, similar to the bridge part 11e (refer to FIGS. 1a, 1b and 2a, 2b) even in this position of the bridge part 11f, the lever 12 (the planar members 12c, 12d) is provided with protrusions 12j, as shown in FIG. 3b,which are adapted to make contact with the bridge part 11f so as to restrict the rotating position of the lever 12 to the same position as that shown in FIGS. 1a, 1b and 2a, 2b.

When the end fitting 16a is inserted from the outside of the drum brake so as to be engaged with the lever 12 (in more detail, the end fitting engaging recesses 12g) in the operating device 10, the end fitting 16a is led through the back plate 17 of the drum brake while its long side having the length $L_1$ is directed orthogonal to the planar members 12c, 12d of the lever 12.

The end fitting 16a is inserted in the wide gap 12h between the planar members 12c, 12d in the reverse direction against the cable pulling, and is abutted against the bridge part 11f as shown.

Next, the control cable 16 is shifted toward the free end 12e of the lever 12 so as to engage the end fitting 16a with the end fitting engaging recesses 12g.

When connecting the control cable 16 to the operating device 10, the end fitting 16a is led through the wide gap 12h between the planar members 12c, 12d in the longitudinally middle position of the lever 12, and thereafter, the control cable 16 is shifted toward the free end 12e of the lever 12 in order to engage the end fitting 16a with the end fitting engaging recesses 12g of the lever 12.

Thus the overall length of the operating device 10 can be shortened, and further, the lever ratio of the lever 12 can be increased so as to reduce the brake operating force, whereby it is able to satisfy both requirements of shortening the overall length of the operating device 10 and of reducing the brake operating force.

Further, since the end fitting 16a abuts against the bridge part 11f when the end fitting 16a is inserted in the wide gap 12h, and in this period the rotation of the lever 12 is inhibited by the bridge part 11f, the end fitting 16a can be prevented from interfering with another component during insertion thereof, and a worker can sense the completion of insertion work of the end fitting 16a. Accordingly, it is also possible to facilitate the engagement or disengagement of the end fitting 16a can be facilitated also in view of these points.

In addition, since the end fitting 16a can be inserted even though the lever 12 is not held, the control cable 16 can be connected to the operating device 10 even after the operating device 10 is incorporated in the drum brake, and accordingly, the handling and the conveyance of the drum brake incorporating the operating device 10 can be facilitated.

In this embodiment, since the bridge part 11f of the strut 11 has both of two functions indispensable to the above advantages, that is, the function of the end fitting stopper for determining the restricted position of the end fitting 16a during insertion of the latter into the wide gap 12h, and the function of the lever abutting part for restricting the rotating position of the lever 12 to the position shown in FIG. 3a, the functional effects and advantages similar to those obtained by the aforementioned embodiment can be more simply and inexpensively achieved.

Further, in this embodiment, as shown in FIGS. 3a and 3b, the end fitting guide piece 11g is provided integrally on the bridge part 11f extending to a position above the narrow gap 2f.

This guide piece 11g surely guides the end fitting 16a when the end fitting 16a is shifted toward the end fitting engaging recesses 12g of the lever 12, thereby it is possible to prevent the end fitting 16a from interfering with another component and being the above work free from difficulties.

Further, the guide piece 11g can also prevent the end fitting 16a from being largely projected from the end fitting engaging recesses 12g even if the control cable 16 has been slackened after the end fitting 16a is engaged with the end fitting engaging recesses 12g, for example, such as before the adjustment work for the pulling margin of the control cable 16 is completed after connection of the control (opposite end) side of the control cable 16, so that even at this time it is possible to prevent the end fitting 16a from interfering with another component.

Referring to FIG. 4 which shows further another embodiment of the present invention, in this embodiment, a bridge part 11f which is arranged at a position similar to that shown in FIGS. 3a, 3b, only serves as the end fitting stopper, the function of the lever abutting part can be obtained by a bridge part 11e which is arranged at a position similar to that shown in FIG. 2.

Accordingly in this embodiment, it is not required to provide the lever 12 with the protrusions 12j as clearly shown in FIG. 3b.

Also it should be noted that the functional effects and advantages similar to those obtained by the aforementioned embodiments can be exhibited.

Figure 4A:
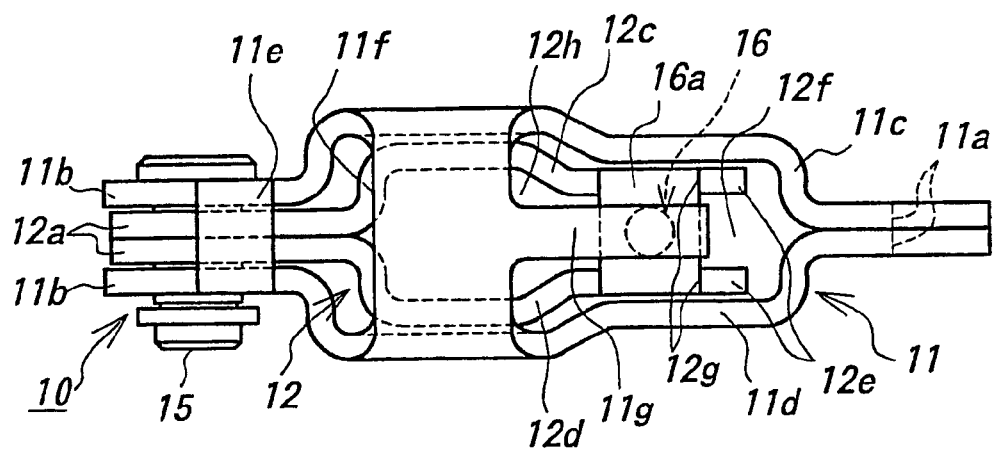
FIG. 4a is a plan view illustrating a drum brake operating device incorporating therein a device for connecting a control cable in further another embodiment of the present invention.
Figure 4B:
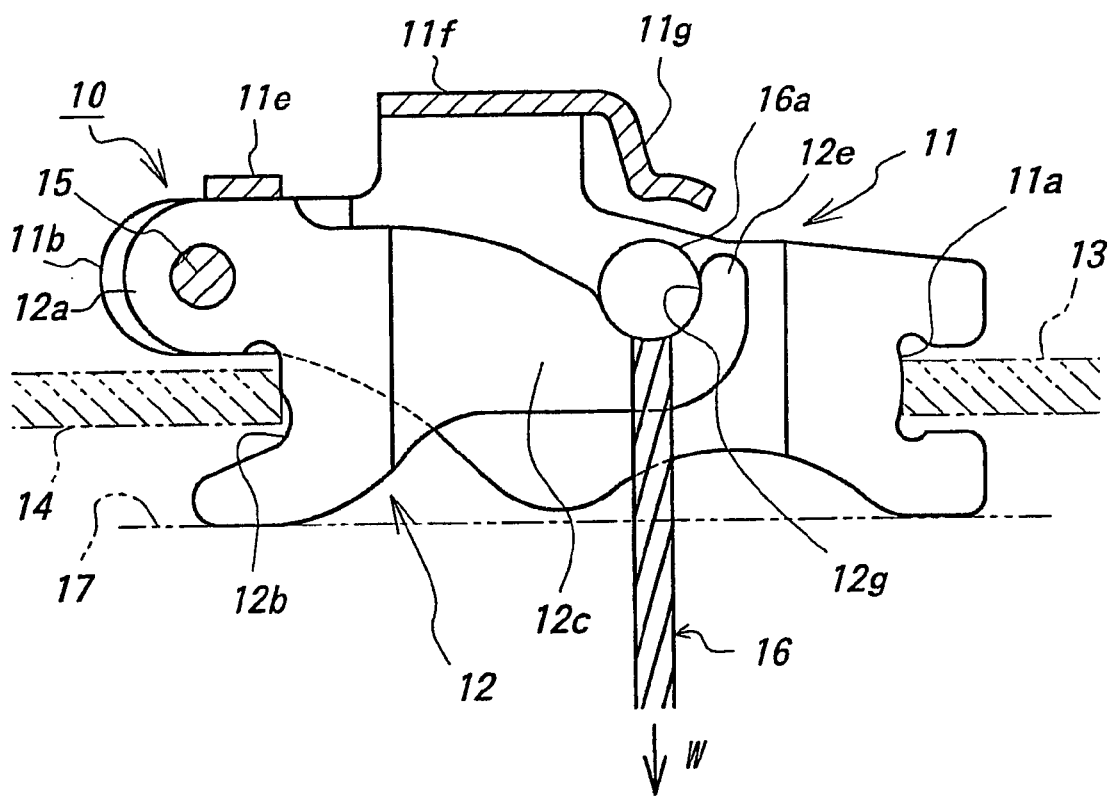
Figure 5A:
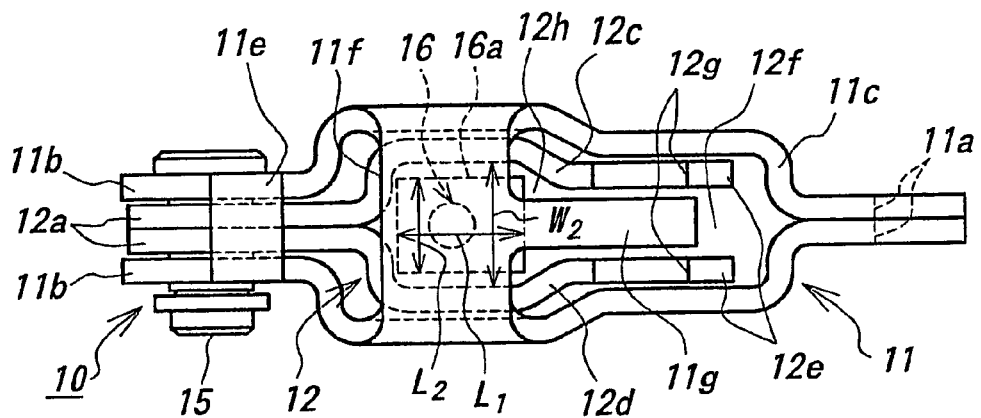
FIG. 5a is a plan view illustrating a drum brake operating device incorporating therein a device for connecting a control cable in further another embodiment of the present invention.
Figure 5B:
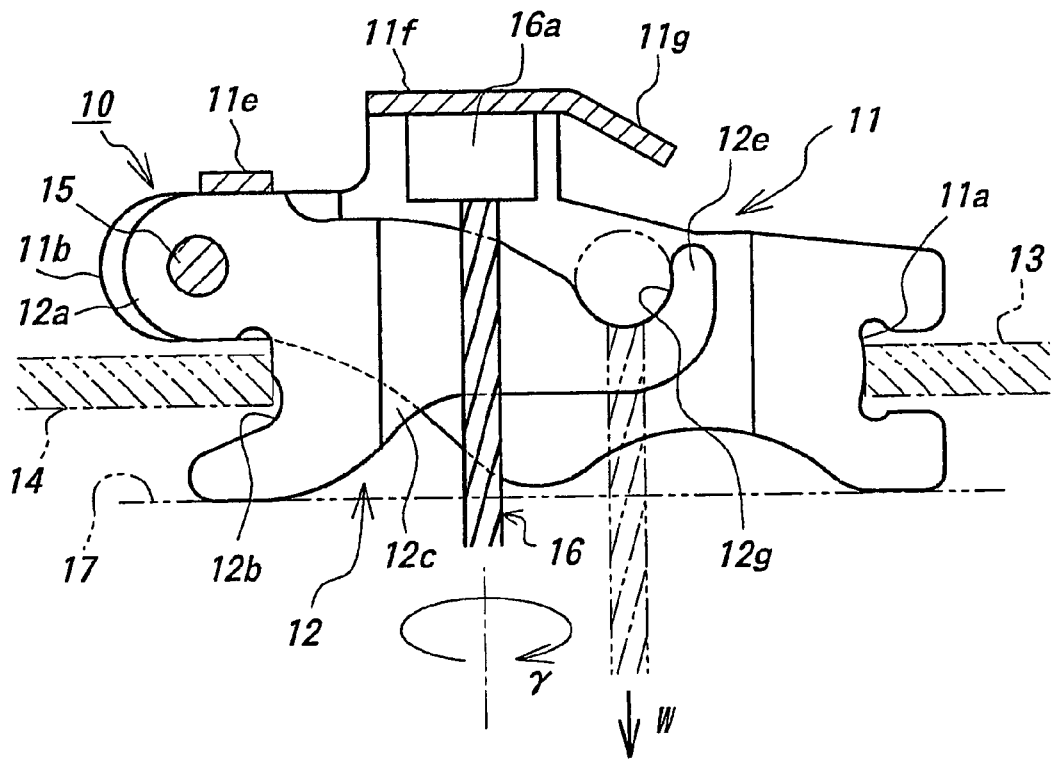

Referring to FIGS. 5a, 5b which shows a further another embodiment of the present invention, in this embodiment, although two bridge parts 11e, 11f are provided on the strut 11, similar to those shown in FIG. 4a, 4b, the width $W_2$ of the wide gap 12h under the bridge part 11f is set to a value which allows the short side $L_2$ of the end fitting 16a to pass through the wide gap 12h but inhibits the long side $L_1$ from passing through.

With this embodiment, when the end fitting 16a is inserted into the operating device 10 from the outside of the drum brake and engaged with the lever 12 (in more detail, the end fitting engaging recesses 12g) therein, firstly the end fitting 16a is led through the back plate 17 of the drum brake while its long side having the length $L_1$ is directed so as to be in parallel with the planar members 12c, 12d of the lever 12, as shown in the figures.

Then, the end fitting 16a is inserted into the wide gap 12h between the planar plates 12c, 12d in a reverse direction against the cable pulling so as to abut against the bridge part 11f as shown in the figures.

After the end fitting 16a has been completely passed through the wide gap 12h, the control cable 16 is rotated around the longitudinal axis thereof by an angle of 90 deg. as shown by the arrow γ in FIG. 5b so that the long side $L_1$ of the end fitting 16a is directed orthogonal to the planar members 12c, 12d of the lever 12.

Thereafter, the control cable 16 is pulled in the pulling direction "W" so as to engage the end fitting 16a with the end fitting engaging recesses 12g on the free end 12e of the lever 12, as indicated by the two-dot-chain line.

It should be noted that the control cable 16 is removed from the operating device 10 by carrying out the above-mentioned steps in the reverse order.

With this embodiment, the functional effects and advantages similar to those which can be exhibited by the aforementioned embodiments, can be achieved, and following another advantage can be also achieved. Namely, in this embodiment, since the width $W_2$ of the wide gap 12h can be made to be smaller than that in the embodiments shown in FIGS. 1a, 1b, 2a, 2b, 3a, 3b, 4a, 4b, the width of the operating device 10 can be reduced.

Figure 6A:
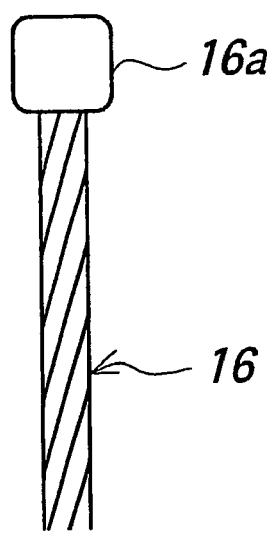
FIG. 6a is a side view illustrating another example of the end fitting of the control cable.
Figure 6B:
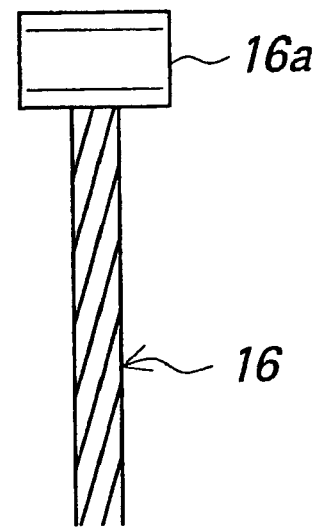
Figure 7A:
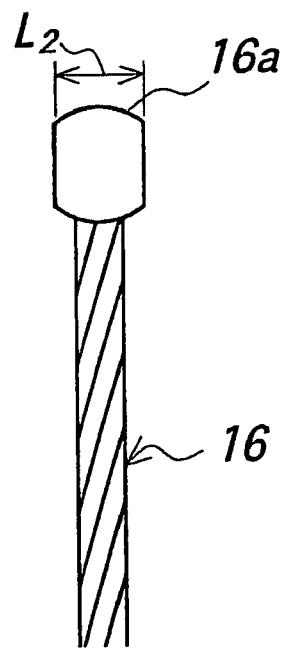
FIG. 7a is a side view illustrating further another example of the end fitting of the control cable.
Figure 7B:
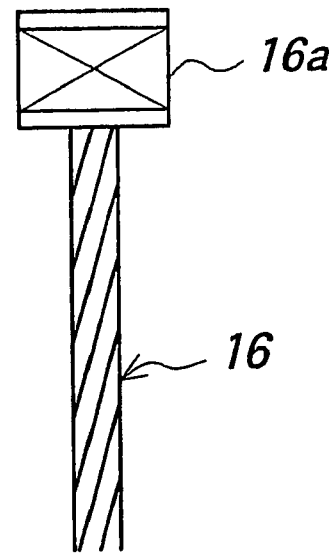

Even though, in any one of the aforementioned embodiments, the end fitting 16a has a cylindrical shape, it should be noted that the end fitting 16a may be a columnar body having a rectangular cross-sectional shape with rounded four corners as shown in FIGS. 6a, 6b or a columnar body with a pair of flat surfaces formed on the outer peripheral cylindrical surface thereof as shown in FIGS. 7a, 7b.

In particular, if the end fitting 16a has the shape as shown in FIGS. 7a, 7b, the short side length $L_2$ of the end fitting 16a is reduced so that the width $W_2$ of the wide gap 12h shown in FIG. 5a, is further decreased so as to further decrease the width of the operating device 10.

Even though the end fitting 16a have any one of the above-mentioned columnar shapes, the end fitting engaging recesses 12g disposed on the free end 12e of the lever 12 are advantageously formed in shape of a circular arc surface, since the end fitting 16a can slide freely in the direction of the circular arc within the end fitting engaging recesses 12g, and accordingly, no local bending stress can be prevented from being applied to the control cable 16 during the rotation of the lever 12 due to the manipulation of the control cable 16, whereby it is possible to enhance the durability thereof.

Figure 8A:
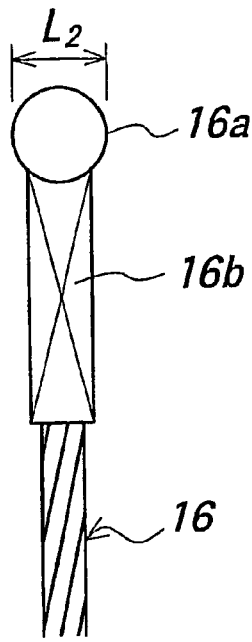
FIG. 8a is a side view illustrating further another example of the end fitting of the control cable.
Figure 8B:
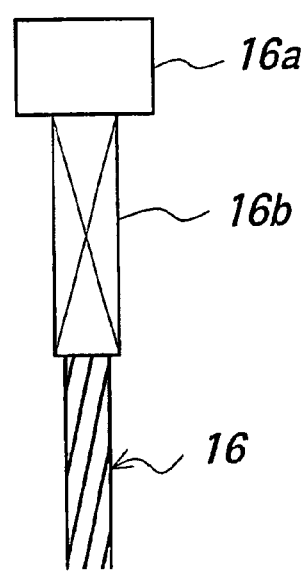
Figure 9:
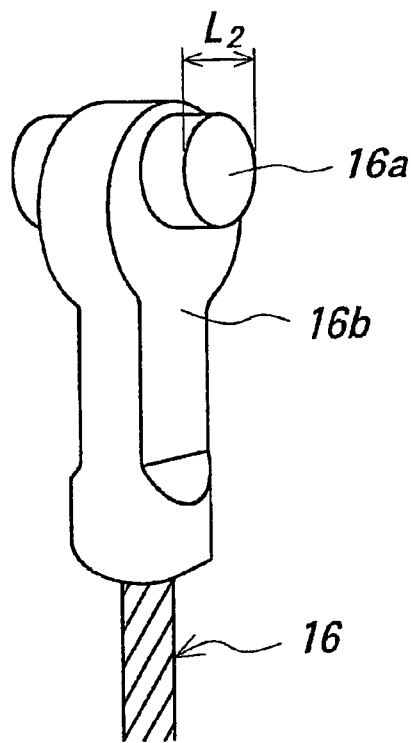
FIG. 9 is a perspective view illustrating further another example of the end fitting of the control cable.

Further, in such a case that the end fitting 16a is formed of a columnar body, the coupling part between the end fitting 16a and the cable 16 is advantageously formed with a flat face 16b, as shown in FIGS. 8a, 8b, 9, which are in parallel with the short side $L_2$ of the end fitting 16a. In this case, this flat face 16b can prevent the end fitting 16a from being rotated around the axis of the cable in the narrow gap 12f, in cooperation with the planar members 12c, 12d, during engaging operation of the end fitting 16a or when the cable 16 has been slackened after completion of engaging of the end fitting 16a. Accordingly, the engaging operation of the end fitting 16a can be facilitated, and the end fitting 16a can be prevented from coming out of the end fitting engaging recesses 12g when the control cable 16 has been slackened.

It should be noted that it is not absolutely necessary to form the end fitting 16a of the control cable 16 into a columnar shape as mentioned above, the end fitting 16a may have any one of various shapes such as a spherical shape having a center located on the axis of the control cable 16 as shown in FIGS. 10a, 10b, without departing the above-mentioned concept of the present invention.

What is claimed is:

1. A device for operating two members, comprising:
   a control cable having an end fitting;
   a strut with a first end adapted to engage one of two members to be operated by the device and a second end connected to a pivot, said strut having two opposing sides with a first gap therebetween; and a lever in said first gap between said two opposing sides that is adapted to engage another of the two members to be operated by the device and having a first end connected to said pivot and a second free end engaged with said end fitting, said lever having two arms that define, at said second free end, a second gap between said two arms that is smaller than said end fitting so as to prevent passage of said end fitting through said second gap, and, between said second free end and said first end of said lever, a third gap between said two arms that is larger than said end fitting so as to permit passage of said end fitting through said third gap.

2. The device of claim 1, further comprising a stopper overlying said third gap and preventing passage of said end fitting beyond said stopper.

3. The device of claim 2, wherein said stopper joins said two sides of said strut.

4. The device of claim 1, further comprising an abutting part overlying said lever that prevents movement of said lever beyond said abutting part.

5. A device for operating two members, comprising:

a strut with a first end with a first indentation therein for operating one of the two members and a second end connected to a pivot, said strut having two opposing sides with a first gap therebetween; and a lever in said first gap between said two opposing sides and having a second indentation therein for operating another of the two members and having a first end connected to said pivot and a second free end, said lever having two arms that define, at said second free end, a second gap between said two arms that has a first width, and, between said second free end and said first end of said lever, a third gap between said two arms that has a second width larger than said first width, said first gap having a first portion between said two opposing sides with a width wider than said lever adjacent to said third gap.

6. The device of claim 5, further comprising an end fitting stopper above said third gap.

7. The device of claim 6, wherein said stopper joins said two sides of said strut.

8. The device of claim 5, further comprising a lever abutting part that prevents movement of said lever beyond said lever abutting part when said lever is rotated.

* * * * *